United States Patent
Almog et al.

(10) Patent No.: US 10,778,361 B1
(45) Date of Patent: Sep. 15, 2020

(54) STREAM SYNCHRONIZATION

(71) Applicant: Mellanox Technologies TLV Ltd., Raanana (IL)

(72) Inventors: Ariel Almog, Kohav Yahir (IL); Thomas Kernen, Russin (CH); Dotan David Levi, Kiryat Motzkin (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/291,003

(22) Filed: Mar. 4, 2019

(51) Int. Cl.
*H04J 3/06* (2006.01)
*H04L 7/04* (2006.01)
*H04L 12/26* (2006.01)
*H04L 7/00* (2006.01)

(52) U.S. Cl.
CPC .......... *H04J 3/0682* (2013.01); *H04J 3/0661* (2013.01); *H04L 7/0041* (2013.01); *H04L 7/042* (2013.01); *H04L 43/0858* (2013.01)

(58) Field of Classification Search
CPC ..... H04J 3/0682; H04J 3/0661; H04L 7/0041; H04L 7/042; H04L 43/0858
See application file for complete search history.

(56) References Cited

U.S. PATENT DOCUMENTS

| | | |
|---|---|---|
| 7,336,646 B2 | 2/2008 | Muller |
| 7,346,698 B2 | 3/2008 | Hannaway |
| 2008/0181260 A1 | 7/2008 | Vonog et al. |
| 2011/0051754 A1* | 3/2011 | Lansdowne ........... H04J 3/0697 370/503 |
| 2015/0063375 A1* | 3/2015 | Tzeng ................... H04J 3/0667 370/512 |
| 2015/0163048 A1* | 6/2015 | Turnbull ............... H04L 47/283 370/508 |
| 2017/0353749 A1* | 12/2017 | Gurfinkel ................ H04L 47/22 |
| 2019/0089615 A1* | 3/2019 | Branscomb ............ H04L 69/28 |

* cited by examiner

*Primary Examiner* — Kyaw Z Soe
(74) *Attorney, Agent, or Firm* — Kligler & Associates Patent Attorneys Ltd

(57) ABSTRACT

A method including providing a network element including an ingress port, an egress port, and a delay equalizer, providing an equalization message generator, receiving, at the ingress port, a plurality of data packets from multiple sources, each data packet having a source indication and a source-provided time stamp, determining, at the ingress port, a received time stamp for at least some of the received data packets, passing the received data packets, the source-provided time stamps, and the received time stamps to the delay equalizer, the delay equalizer computing, for each source, a delay for synchronizing that source with other sources, the equalization message generator receiving an output, for each source, including the delay for that source, from the delay equalizer and producing a delay message instructing each source regarding the delay for that source, and sending, from the egress port, the delay message to each source. Related apparatus is also provided.

24 Claims, 4 Drawing Sheets

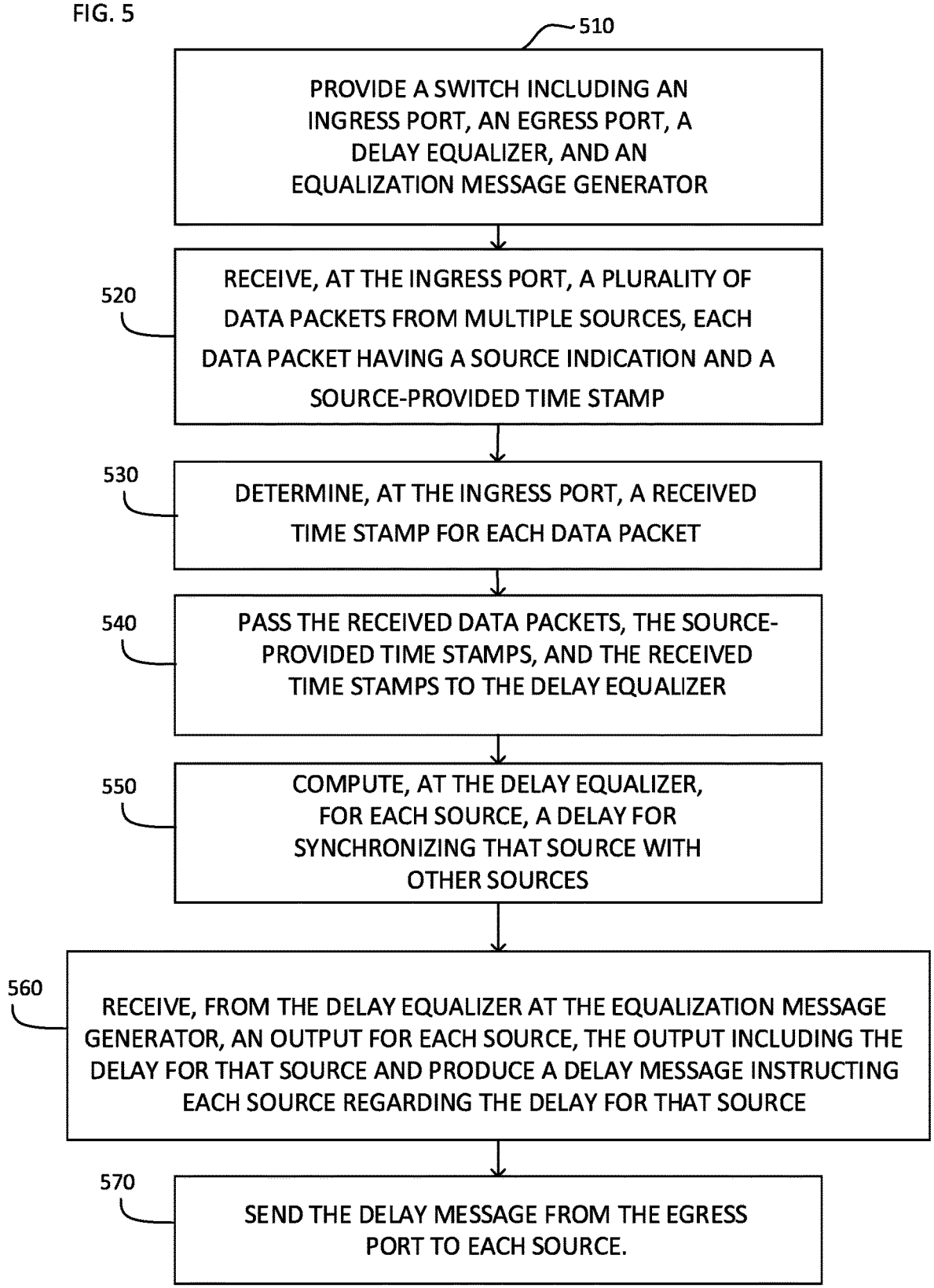

STREAM SYNCHRONIZATION

FIELD OF THE INVENTION

The present invention relates to stream synchronization.

BACKGROUND OF THE INVENTION

In the past, SDI (Serial Digital Interface) switches have been used for stream synchronization. In the particular example of media and entertainment, when Internet Protocol (IP) was not used in the past for media, the video switcher would re-clock the streams with up to one frame of buffer (about 25 milliseconds, frame rate dependent) if the flows were not aligned. Over time, an increase in bandwidth caused a need for larger buffers. With the move to IP, with IP streams being switched by an IP switch, using existing techniques, synchronization cannot be done except on the receiver device, since holding a video frame or audio sample is not what an IP switch is designed for. Furthermore, holding a video frame or audio sample would introduce undesirable latency. The receiver-based flow switch requires doubling of bandwidth, since both the current flow and the new flow need to be sent to the receiver, since flow alignment may not be guaranteed.

SUMMARY OF THE INVENTION

The present invention, in certain embodiments thereof, seeks to provide an improved system and method for synchronizing streams.

There is thus provided in accordance with an exemplary embodiment of the present invention a method including providing a network element including an ingress port, an egress port, and a delay equalizer, providing an equalization message generator, receiving, at the ingress port, a plurality of data packets from multiple sources, each data packet having a source indication and a source-provided time stamp, determining, at the ingress port, a received time stamp for at least some of the received data packets, passing the received data packets, the source-provided time stamps, and the received time stamps to the delay equalizer, the delay equalizer computing, for each source, a delay for synchronizing that source with other sources, the equalization message generator receiving an output, for each source, including the delay for that source, from the delay equalizer and producing a delay message instructing each source regarding the delay for that source, and sending, from the egress port, the delay message to each source.

Further in accordance with an exemplary embodiment of the present invention the network element includes the equalization message generator.

Still further in accordance with an exemplary embodiment of the present invention the ingress port includes a plurality of ingress ports.

Additionally in accordance with an exemplary embodiment of the present invention the determining includes determining a received time stamp for all of the received data packets.

Moreover in accordance with an exemplary embodiment of the present invention each source sets a source delay based on the delay message received by each source.

Further in accordance with an exemplary embodiment of the present invention, after each source sets the source delay, packets sent from each source to the network element are received at the network element in synchronization with packets sent from each other source.

Still further in accordance with an exemplary embodiment of the present invention each source includes at least one stream source.

Additionally in accordance with an exemplary embodiment of the present invention the at least one stream source includes one of an audio source, a video source, and an audio/video source.

Moreover in accordance with an exemplary embodiment of the present invention the at least one stream source includes a meta-data source.

Further in accordance with an exemplary embodiment of the present invention the meta-data includes at least one of meta-data associated with audio, meta-data associated with video, meta-data associated with a financial application, and meta-data associated with telemetry.

Still further in accordance with an exemplary embodiment of the present invention the network element also includes an equalization database configured for storing, for each data packet, the source-provided time stamp, the received time stamp, and the delay.

Additionally in accordance with an exemplary embodiment of the present invention the delay equalizer computes the delay for each source by performing the following: for each data packet, determining a communication trip time for the source which sent that data packet by comparing the received time stamp for that packet to the source-provided time stamp for that packet, determining a maximum communication trip time for the sources, and computing, for each source, a difference between the communication time for that source and the maximum communication time, and assigning the delay for that source based on the computed difference for that source.

There is also provided in accordance with another exemplary embodiment of the present invention apparatus including a network element including an ingress port, an egress port, and a delay equalizer, and an equalization message generator, the ingress port being configured for receiving a plurality of data packets from multiple sources external to the apparatus, each data packet having a source indication and a source-provided time stamp, the ingress port being further configured for determining a received time stamp for at least some of the data packets and to pass the received data packets, the source-provided time stamps, and the received time stamps to the delay equalizer, the delay equalizer being configured for computing, for each source, a delay for synchronizing that source with other sources, the equalization message generator being configured for receiving an output, for each source, including the delay for that source, from the delay equalizer and for producing a delay message instructing each source regarding the delay for that source, and the egress port being configured for sending the delay message to each source.

Further in accordance with an exemplary embodiment of the present invention the network element includes the equalization message generator Still further in accordance with an exemplary embodiment of the present invention the ingress port includes a plurality of ingress ports.

Additionally in accordance with an exemplary embodiment of the present invention the determining includes determining a received time stamp for all of the received data packets.

Moreover in accordance with an exemplary embodiment of the present invention each source sets a source delay based on the delay message received by each source.

Further in accordance with an exemplary embodiment of the present invention after each source sets the source delay, packets sent from each source to the network element are received at the network element in synchronization with packets sent from each other the source.

Still further in accordance with an exemplary embodiment of the present invention each source includes at least one stream source.

Additionally in accordance with an exemplary embodiment of the present invention the at least one stream source includes one of an audio source, a video source, and an audio/video source.

Moreover in accordance with an exemplary embodiment of the present invention the at least one stream source includes a meta-data source.

Further in accordance with an exemplary embodiment of the present invention the meta-data includes at least one of meta-data associated with audio, meta-data associated with video, meta-data associated with a financial application, and meta-data associated with telemetry.

Sill further in accordance with an exemplary embodiment of the present invention the network element also includes an equalization database configured for storing, for each data packet, the source-provided time stamp, the received time stamp, and the delay.

Additionally in accordance with an exemplary embodiment of the present invention the delay equalizer is configured for computing the delay for each source by performing the following: for each data packet, determining a communication trip time for the source which sent that data packet by comparing the received time stamp for that packet to the source-provided time stamp for that packet, determining the maximum communication trip time for the sources, and computing, for each source, a difference between the communication time for that source and the maximum communication time, and assigning the delay for that source based on the computed difference for that source.

BRIEF DESCRIPTION OF THE DRAWINGS

The present invention will be understood and appreciated more fully from the following detailed description, taken in conjunction with the drawings in which:

FIG. 5 is a simplified flowchart illustration of an exemplary method of operation of the system of FIG. 1.

DETAILED DESCRIPTION OF AN EMBODIMENT

Generally speaking, a problem can arise when a number of stream sources (sources of streams such as, by way of non-limiting example, audio/video streams) each send a stream to a central device, such as a switching device. In many applications, it can be desirable to synchronize the various stream sources so that, for example, if a transition is intended to occur at a certain time (for example, at 10:00:00 AM), each source will be synchronized to exactly the same time and it will be easier for the transition to take place. A problem arises in that, in general, different sources are not exactly synchronized; even if each source is synchronized to a high-precision clock, differences in distance and in communication media from the switching device can lead to a lack of synchronization at the switching device. In the view of the inventors of the present example, there are no fully adequate known solutions to such a problem.

In one particular non-limiting example, consider the example of the media and entertainment market. While in general media, entertainment, and audio/video are described herein, it is appreciated that exemplary embodiments of the present invention are not limited to such systems. Rather, it is contemplated that, by way of non-limiting example, certain embodiments of the present invention may apply to any appropriate data stream, such as, without limiting the generality of the foregoing, meta-data streams (which might include meta-data associated with audio or video; meta-data associated with a financial application; meta-data associated with telemetry; or any other appropriate meta-data).

In media and entertainment, often many source streams from many transmission devices are forwarded to a selector switch. The media and entertainment producer selects a single stream from a set of source streams (which could, by way of particular non-limiting examples, be a live sporting event; could apply in any appropriate production environment such as a large broadcaster who needs to change the input for their output, and needs to align correctly; could apply at a particular time, such as midnight, when moving to a different content line-up, which needs to do it with continuity, known as "salvo"). The selected single stream is to be used by a given device via selector switch; an example is the live stream to be aired from any one of the sources, such as, by way of non-limiting example a camera.

When the producer replaces the source for a broadcast stream, the replaced stream and the replacing stream should be closely synchronized in order to assure a smooth transition between the streams. In case the streams are not synchronized, the broadcast stream may suffer from lack or duplication of data which will cause for stream quality degradation due to cutting in the middle of the transmitted image, audio sample or meta-data.

Figure 1:
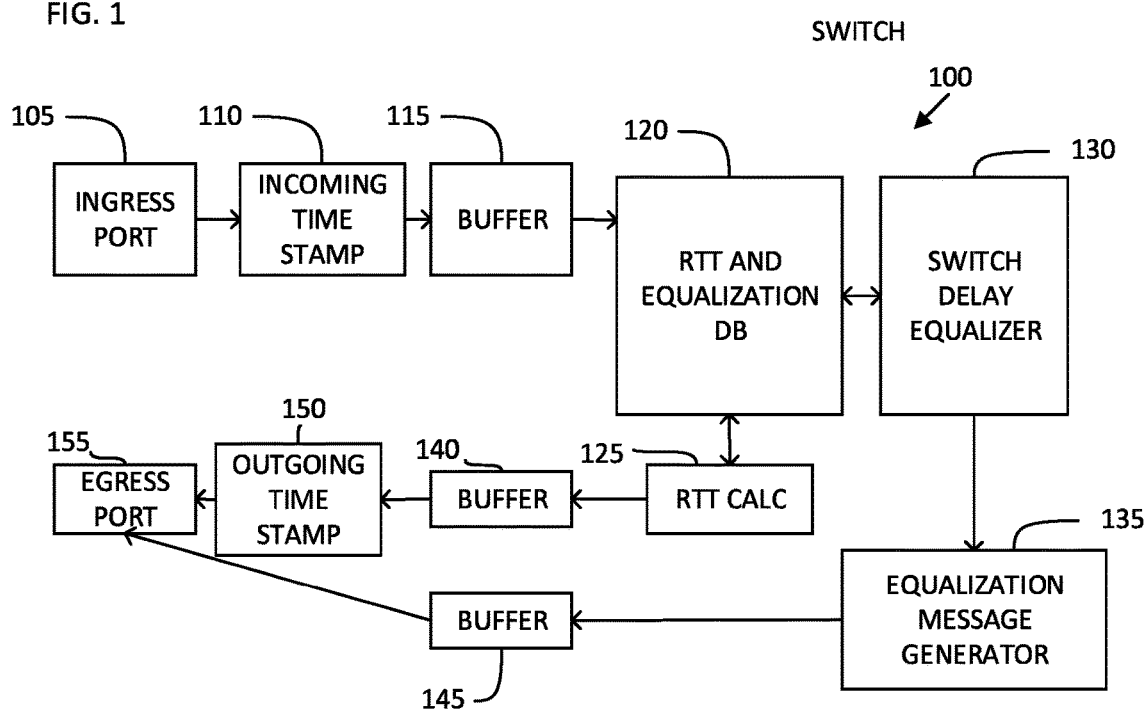
FIG. 1 is a simplified block diagram illustration of a stream synchronization system constructed and operative in accordance with an exemplary embodiment of the present invention.

Reference is now made to FIG. 1, which is a simplified block diagram illustration of a stream synchronization system constructed and operative in accordance with an exemplary embodiment of the present invention.

The exemplary system of FIG. 1 comprises a network element 100. By way of non-limiting example, the network element 100 may comprise an appropriate switch, network interface card (NIC), or host channel adapter (HCA). While the particular example of a switch (including in compound phrases such as "switch delay") may be discussed herein in some contexts and shown in the drawings in some contexts, it is appreciated that the particular example of a switch is not meant to be limiting; any appropriate network element may be used. In general, an appropriate network element 100 comprises at least one ingress port and at least one egress port, as described further below.

One particular non-limiting example of a switch which could be modified in accordance with the description herein is the Spectrum-2 family of switches, commercially available from Mellanox Technologies Ltd. Similarly, one particular non-limiting example of both a NIC and an HCA is the ConnectX-5 device, also commercially available from Mellanox Technologies limited.

The network element 100 comprises an ingress port 105, at which packets from stream sources (exemplary embodiments of which are described in more detail below with reference to FIG. 2) are received. It is appreciated that there may be a plurality of ingress ports 105, only one being shown and described for simplicity of depiction and description. In exemplary embodiments of the system of FIG. 1; packets which are received at the ingress port 105 include a time stamp indicating a time at which the packets were sent to the network element 100.

The network element 100 further comprises an incoming time stamp unit 110, which applies a time stamp to each packet received at the ingress port 105, indicating time of receipt of each packet.

The network element 100 further comprises a buffer 115, which buffers incoming packets on their way to further processing by other elements of the network element 100.

Received packets are then sent to a return trip time (RTT) and equalization database 120, which is operatively associated with an RTT calculator 125, both of which are comprised in the network element 100. The RTT calculator calculates a round trip time for communicating with the stream sources, based on the time stamp indicating a time at which the packets were sent to the network element 100, and on the time stamp applied by the time stamp unit 110 indicating a time at which the packets were received by the network element 100; generally speaking, the RTT will be approximately twice the difference between the two time stamps. For greater precision, packets may be sent by the network element 100 to the stream sources, and responded to with return packets, thus more directly determining RTT.

The RTT is provided to the RTT and equalization database 120, which stores round trip times for a plurality of stream sources. The term "equalization" in its various grammatical forms, as discussed in further detail below, refers herein to determining a value based on computed RTT for all streams, in order to provide synchronization as explained above.

The RTT for each stream source is provided to a switch delay equalizer 130 comprised in the network element 130. The switch delay equalizer compares the RTT for each stream source, and determines, for each stream source, a delay which is to be applied in order to synchronize that stream source with other stream sources.

In exemplary embodiments of the present invention, the maximum RTT for the various stream sources, within a given media frame, is determined. Generally speaking, the RTT for a stream source which is farthest from the network element 100 will be the maximum. In exemplary embodiments, a goal is to compensate for alignment of media offset between the various stream sources, so that each stream source will present packets to the network element 100 with simultaneous frame start, in so far as possible. In general, packets sent from a given stream source are provided with a flag or sequence number indicating frame start.

In certain exemplary embodiments of the present invention, one-way packet transmission delay may be used instead of RTT. In such a case, persons skilled in the art will appreciate that replacing the term "RTT" herein with "one-way delay" or "frame offset arrival delay" will thus yield certain alternative exemplary embodiments, mutatis mutandis.

The switch delay equalizer 130 provides the determined switch delay for each stream source to an equalization message generator 135 comprised in the network element 100.

While the equalization message generator 135 is shown and described as comprised in the network element 100 for ease of depiction and description, it is appreciated that, in alternative exemplary embodiments of the present invention, the equalization message generator may be external to the network element 100. In one particular non-limiting example, a device which identifies lip-sync issues based on visual image processing may comprise an equalization message generator 135 external to the network element 100, and may send equalization messages as described herein to the network element 100.

Similarly, it is appreciated that, in certain exemplary embodiments of the present invention, other arrangements of elements, in which certain other elements shown as comprised in the network element 100 are in operative association with the network element 100 but not necessarily comprised therein, may be used.

The equalization message generator 135 produces, for each stream source, an equalization message, intend for each such stream source, informing the stream source of a delay to bring that steam source into synchronization with other stream sources.

The network element 100 also comprises buffers 140 and 145, and an outgoing time stamp unit 150; in certain exemplary embodiments of the present invention, the outgoing time stamp unit 150 may be optional. Calculated RTT values are sent to a buffer 140, while equalization messages produced by the equalization message generator 135 are sent to a buffer 145. The equalization messages each receive an egress time stamp at a time stamp unit 150, and are passed on to an egress port 155, for sending to an appropriate stream source. It is appreciated that while buffers 140 and 145 are shown as separate buffers for purposes of ease of understanding of exemplary embodiments of the present invention, alternatively only a single buffer may be used.

Figure 2:
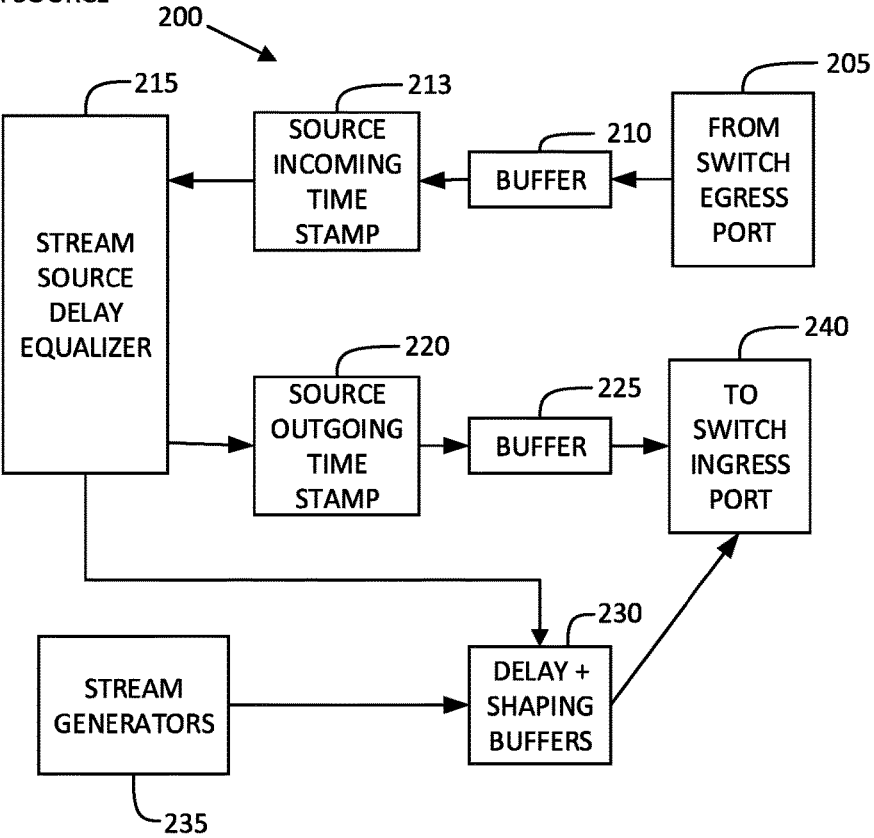
FIG. 2 is a simplified block diagram illustration of a stream source, in operative communication with the stream synchronization system of FIG. 1.

Reference is now additionally made to FIG. 2, which is a simplified block diagram illustration of a stream source 200, in operative communication with the stream synchronization system of FIG. 1. It is appreciated that, in general, there is a plurality of stream sources such as the stream source 200. In preferred embodiments of the present invention, each stream source 200 may comprise an appropriate network interface controller (NIC), or another suitable device; an appropriate non-limiting NIC which could be modified in accordance with the present description is the ConnectX device family, commercially available from Mellanox Technologies Ltd.

The stream source 200 comprises an input port 205, in operative communication with the egress port 155 (FIG. 1). At the input port 205, packets as well as equalization message/s (as described above) is/are received. Each received packet and each received equalization message is buffered in a buffer 210 and time stamped with an incoming time stamp at a source incoming time stamp unit 213.

The stream source includes one or more stream generators 235, which generate streams (such as audio-visual streams) comprising packets, which are sent to delay and shaping buffers 230. In the delay and shaping buffers 230, packets produced by the stream generators 235 are delayed in accordance with the delay indicated in received equalization messages and shaped/paced so that the packets are output with appropriate spacing therebetween, as is known in the art; the packets are then sent on to an output port 240 in operative communication with the ingress port 105 (FIG. 1). It is appreciated that while buffers 225 and 230 are shown as separate buffers for purposes of ease of understanding of exemplary embodiments of the present invention, alternatively only a single buffer may be used.

Figure 3:
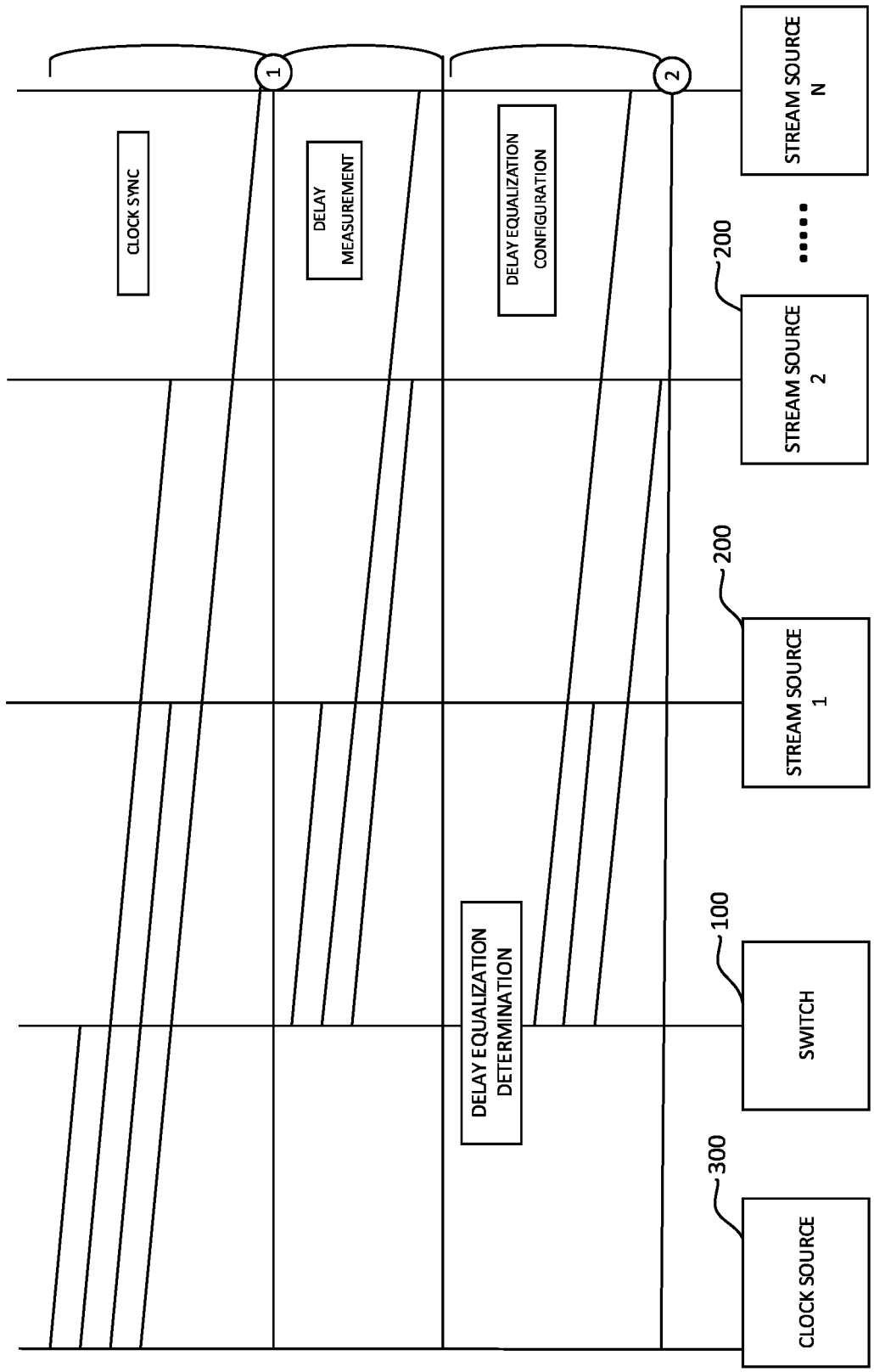
FIG. 3 is a simplified illustration showing an exemplary synchronization process performed by the systems of FIGS. 1 and 2.

Reference is now made to FIG. 3, which is a simplified illustration showing an exemplary synchronization process performed by the systems of FIGS. 1 and 2.

In the process of FIG. 3, the network element 100 (FIG. 1) and stream sources 200 (FIG. 2) communicate with a clock source 300, which may be a clock source providing, for example, Network Time Protocol (NTP) or Precision Time Protocol (PTP) time, as is known in the art. By communicating with the clock source 300, each of the network element 100 and the stream sources 200 synchronize their clocks to the same time. The network element 100 and the stream sources 200 then undergo a delay equalization process as described above with reference to FIGS. 1 and 2. This portion of the process depicted in FIG. 3 is indicated with the circled numeral "1".

Once delay equalization has occurred, streams sent from each of the stream sources 200 to the network element 100 arrive in a synchronized manner, as is indicated in the portion of the process depicted in FIG. 3 which is indicated with the circled numeral "2".

Figure 4:
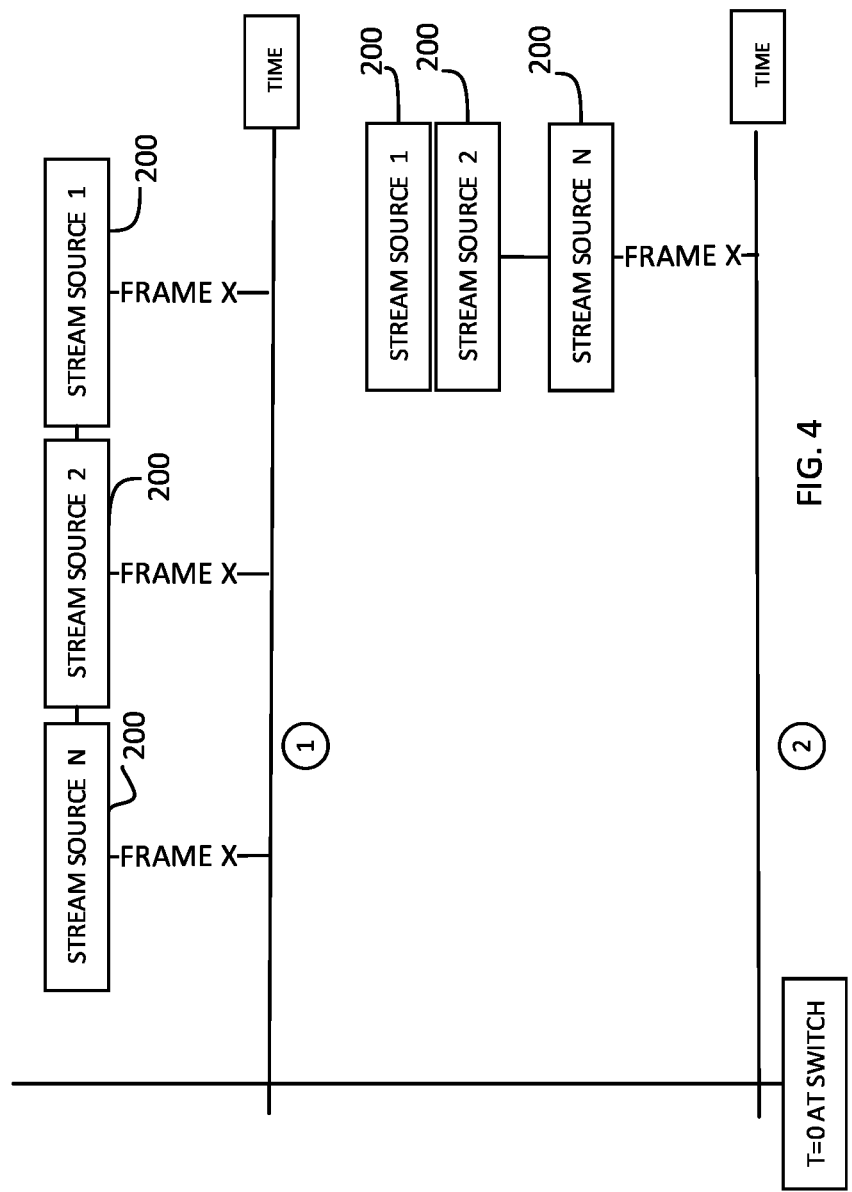
FIG. 4 is a simplified exemplary timeline illustration useful for understanding the exemplary synchronization process of FIG. 3.

Reference is now additionally made to FIG. 4, which is a simplified exemplary timeline illustration useful for understanding the exemplary synchronization process of FIG. 3. As shown in FIG. 4, in a portion of the process indicated with the circled numeral "1" as in FIG. 3, related frames from each of the stream sources 200 are received at the network element 100 (FIG. 1) at different times. In a portion of the process indicated with the circled numeral "2" as in FIG. 3, related frames from each of the stream sources 200 are received at the network element 100 (FIG. 1) simultaneously or substantially simultaneously.

Reference is now made to FIG. 5, which is a simplified flowchart illustration of an exemplary method of operation of the system of FIG. 1. The exemplary method of FIG. 5 (which is not meant to be limiting) includes the following steps:

A switch (as a non-limiting example of a network element) is provided. The switch includes an ingress port, and egress port, a delay equalizer, and an equalization message generator (step 510).

At the ingress port, a plurality of data packets are received from multiple sources. Each data packet has a source indication and a time stamp provided at the respective source (step 520).

At the ingress port, a received time stamp is determined for each data packet (step 530). In alternative exemplary embodiments of the present invention, instead of determining a received time stamp for each data packets, the determination may be made for only certain packets such as, by way of particular non-limiting example, "start of frame" packets.

The received data packets, the source-provided time stamps, and the received time stamps are passed to the delay equalizer (step 540).

For each source, the delay equalizer computes a delay for synchronizing that source with other sources (step 550).

The equalization message generator receives, from the delay equalizer, an output for each source. The output includes the delay for that source. The equalization message generator produces a delay message instructing each source regarding the delay for that source (step 560).

The respective delay messages are sent from the egress port to each source (step 570).

In exemplary embodiments of the present invention, the process of FIG. 3 is carried out at system startup and/or at network initialization (in exemplary embodiments, "system startup" refers to startup of the system as a whole, such as startup of the network element 100 of FIG. 1, while initialization refers to initialization of a particular source, such as the stream source 200 of FIG. 2). In other cases, the process could be carried out at request of a system operator. In exemplary embodiments, the RTT and equalization database 120 of FIG. 1 is persistent, so that statistical and other information about system performance can be collected and analyzed.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
providing a network element comprising an ingress port, an egress port, and a delay equalizer;
providing an equalization message generator;
receiving, at the ingress port, a plurality of data packets from multiple sources, each data packet having a source indication and a source-provided time stamp;
determining, at the ingress port, a received time stamp for at least some of the received data packets;
passing the received data packets, the source-provided time stamps, and the received time stamps to the delay equalizer;
the delay equalizer computing, for each source, a delay for synchronizing that source with other sources;
the equalization message generator receiving an output, for each source, comprising the delay for that source, from the delay equalizer and producing a delay message instructing each source regarding the delay for that source; and
sending, from the egress port, the delay message to each source.

2. The method according to claim 1 and wherein the network element comprises the equalization message generator.

3. The method according to claim 1 and wherein the ingress port comprises a plurality of ingress ports.

4. The method according to claim 1 and wherein the determining comprises determining a received time stamp for all of the received data packets.

5. The method according to claim 1, and wherein each said source sets a source delay based on the delay message received by each said source.

6. The method according to claim 5 and wherein, after each said source sets the source delay, packets sent from each said source to said network element are received at said network element in synchronization with packets sent from each other said source.

7. The method according to claim 6 and wherein each said source comprises at least one stream source.

8. The method according to claim 7 and wherein said at least one stream source comprises one of: an audio source; a video source; and an audio/video source.

9. The method according to claim 7 and wherein said at least one stream source comprises a meta-data source.

10. The method according to claim 9 and wherein the meta-data comprises at least one of: meta-data associated with audio; meta-data associated with video; meta-data associated with a financial application; and meta-data associated with telemetry.

11. The method according to claim 1 and wherein the network element also comprises an equalization database configured for storing, for each data packet, the source-provided time stamp, the received time stamp, and the delay.

12. The method according to claim 1 and wherein the delay equalizer computes the delay for each source by performing the following:
for each data packet, determining a communication trip time for the source which sent that data packet by comparing the received time stamp for that packet to the source-provided time stamp for that packet;
determining a maximum communication trip time for the sources; and
computing, for each source, a difference between the communication time for that source and the maximum communication time, and assigning the delay for that source based on the computed difference for that source.

13. Apparatus comprising:
a network element comprising:
an ingress port;
an egress port; and
a delay equalizer; and
an equalization message generator,
the ingress port being configured for receiving a plurality of data packets from multiple sources external to the apparatus, each data packet having a source indication and a source-provided time stamp,
the ingress port being further configured for determining a received time stamp for at least some of the data packets and to pass the received data packets, the source-provided time stamps, and the received time stamps to the delay equalizer,
the delay equalizer being configured for computing, for each source, a delay for synchronizing that source with other sources,
the equalization message generator being configured for receiving an output, for each source, comprising the delay for that source, from the delay equalizer and for producing a delay message instructing each source regarding the delay for that source, and
the egress port being configured for sending the delay message to each source.

14. Apparatus according to claim 13, and wherein the network element comprises the equalization message generator.

15. Apparatus according to claim 13, and wherein the ingress port comprises a plurality of ingress ports.

16. Apparatus according to claim 13, and wherein the determining comprises determining a received time stamp for all of the received data packets.

17. Apparatus according to claim 13, and wherein each said source sets a source delay based on the delay message received by each said source.

18. Apparatus according to claim 17 and wherein, after each said source sets the source delay, packets sent from each said source to said network element are received at said network element in synchronization with packets sent from each other said source.

19. Apparatus according to claim 18 and wherein each said source comprises at least one stream source.

20. Apparatus according to claim 19 and wherein said at least one stream source comprises one of: an audio source; a video source; and an audio/video source.

21. Apparatus according to claim 19 and wherein said at least one stream source comprises a meta-data source.

22. Apparatus according to claim 21 and wherein the meta-data comprises at least one of: meta-data associated with audio; meta-data associated with video; meta-data associated with a financial application; and meta-data associated with telemetry.

23. Apparatus according to claim 13 and wherein the network element also comprises an equalization database configured for storing, for each data packet, the source-provided time stamp, the received time stamp, and the delay.

24. Apparatus according to claim 13 and wherein the delay equalizer is configured for computing the delay for each source by performing the following:
for each data packet, determining a communication trip time for the source which sent that data packet by comparing the received time stamp for that packet to the source-provided time stamp for that packet;
determining the maximum communication trip time for the sources; and
computing, for each source, a difference between the communication time for that source and the maximum communication time, and assigning the delay for that source based on the computed difference for that source.

* * * * *